Patented Oct. 15, 1935

2,017,815

UNITED STATES PATENT OFFICE 2,017,815

PREPARATION OF 1-PHENYL-3-METHYL-PYRAZOLONE-5 AND RELATED COMPOUNDS

Franklin Johnston, Charleston, W. Va., assignor to Carbide and Carbon Chemicals Corporation, a corporation of New York No Drawing. Application April 21, 1934, Serial No. 721,767

12 Claims. (Cl. 260—45)

The invention relates to a process for the production of pyrazolone derivatives of the general type 1-R-3-methylpyrazolone-5, wherein R represents an aromatic group. Typical of these compounds is 1-phenyl-3-methylpyrazolone-5, which has an established use for various purposes in the chemical art. This and similar pyrazolones, containing other aromatic radicals in the -1-position of the ring, are within the group of chemicals to which this process is especially applicable.

Broadly the process consists in reacting diketene with a hydrazine of the general formula $RNH-NH_2$, in which R is an aromatic group or radical of the type desired in the final product. By proper control of the reaction conditions, a new process is provided for making pyrazolone compounds, which is more efficient and commercially feasible than any heretofore known.

The prior art shows the preparation of these compounds by a condensation reaction between ethylacetoacetate and hydrazines. Phenyl hydrazine, for example, has been reacted in this manner to produce 1-phenyl-3-methylpyrazolone-5, with the elimination of one molecule of water and one of ethyl alcohol. Low yields, and other disadvantages, detract, however, from the economy of this method in its commercial application. A reaction between phenylhydrazine and diketene has also been described in the literature (Chick & Wilsmore, J. Chem. Soc. 93,948 (1908)), but in this article it is concluded that one mol of diketene reacts with two mols of the hydrazine, and the resulting product was identified as the phenylhydrazone-phenylhydrazide of acetoacetic acid. There is no indication in the prior art of conditions under which a pyrazolone-5 composition can be formed from diketene and phenylhydrazine.

In accordance with my invention, I have found that, under properly controlled conditions a reaction can be effected between equal molecular proportions of phenyl hydrazine and diketene to produce 1-phenyl-3-methylpyrazolone-5. It has furthermore been determined that this reaction is generally applicable to the preparation of pyrazolone-5 compounds of the type 1-R-3-methylpyrazolone-5, where R is an aromatic radical. Any hydrazine, $RNH-NH_2$—in which R represents the aromatic radical desired in the final product—will react, in the manner of this invention, with equal molar ratios of diketene. The reaction is conducted in the presence of a solvent, at a temperature preferably of about 80° C. to 85° C., and the water, as formed, is preferably continuously removed from the reaction mixture. Benzene and toluene are suitable as a solvent material, but when the latter is used, a reduced pressure is necessary to remove the toluene water mixture. An intermediate product is formed during the process, but it is unnecessary to isolate this as such, in order to carry the pyrazolone reaction to completion. As applied to the preparation of 1-phenyl-3-methylpyrazolone-5, a yield as high as 85% of the theoretical has been produced, and it is possible to obtain additional pyrazolone by treatment of the mother liquors.

The following examples are illustrative of the invention.

*Example 1*

Phenylhydrazine in the amount of 54 grams (½ mol) was dissolved in 300 c. c. of benzene, and placed in a round-bottomed flask fitted with a stirrer, dropping funnel, thermometer, and a short goose-neck for distilling off the benzene-water mixture. The benezene solution was heated to boiling, and 42 grams (½ mol) of diketene added drop by drop over a period of ½ hour. During this time benzene and water were distilled off continuously, and within 10 minutes after all the diketene had been added, two-thirds of the original benzene had been removed from the reaction flask. Very little, if any, diketene could be detected in this distillate. The reaction mixture was then stirred until the temperature dropped to 60° C., at which point it was poured into a beaker and allowed to crystallize. The mother liquor was filtered off and the crystalline pyrazolone washed three times with ether. A yield of 71 grams, or 82%, of a white product with a faint yellow tinge was obtained. This had a melting point of 126°–128° C., and was identified as 1-phenyl-3-methylpyrazolone-5.

*Example 2*

In a procedure identical with the above, and with the same reacting materials, toluene was used as a solvent instead of benzene. In this instance, however, a column was employed for the distillation of the toluene-water mixture, and reduced pressure was employed to maintain a reaction temperature no higher than 85° C. The yield and the product obtained was the same as before.

*Example 3*

With other aromatic hydrozines, in equal molecular proportions with diketene, and under reaction conditions similar to Example 1, the following three pyrazolones were prepared.

2,4-dinitrophenylhydrazine gave a reaction with a yield of 80%, of the product 1-(2',4' dinitrophenyl)-3-methylpyrazolone-5, having a melting point of 260° C.

m-tolylhydrazine gave a reaction with a yield of 73-74%, of the product 1-(m-methylphenyl)-3-methylpyrazolone-5, having a melting point of 109°-110° C.

p-tolyhydrazine gave a reaction with a yield of 57-58%, of the product 1-(p-methylphenyl)-3-methylpyrazolone-5, having a melting point of 128°-130° C.

It will be understood that the above examples show the preferred reaction conditions, but modifications may be made therein within the scope of the invention. While the best yields have been obtained with a temperature of about 80° C. to 85° C., a reaction temperature of as high as 110° C. has also been used. Below 80° C. completion of the reaction involves a considerable time element, and from present indications no appreciable amounts of pyrazolone are formed at substantially lower temperatures, such as 40° C. Continuous removal of water from the reaction mixture is also desirable for better efficiency, but is not necessary to maintain the reaction.

The invention should not be limited other than as defined in the appended claims.

I claim:

1. The process which comprises reacting equal molecular proportions of a hydrazine of the type RNH—NH$_2$, in which R represents a radical of the benzene series, with diketene, at a temperature higher than about 40° C.

2. The process which comprises reacting equal molecular proportions of a hydrazine of the type RNH—NH$_2$, in which R represents a radical of the benzene series, with diketene at a temperature of from about 80° C. to about 85° C., in the presence of an inert solvent.

3. The process which comprises dissolving a hydrazine of the type RNH—NH$_2$, in which R represents a radical of the benzene series, in an inert liquid solvent, heating the solution to a temperature higher than about 40° C., slowly adding diketene thereto in an amount of equal molecular proportions with the hydrazine, and recovering the product of reaction by crystallization.

4. A process of making 1-phenyl-3-methylpyrazolone-5, which comprises reacting equal molecular proportions of phenylhydrazine and diketene, at a temperature higher than about 40° C.

5. A process for making 1-phenyl-3-methylpyrazolone-5, which comprises reacting equal molecular proportions of phenylhydrazine and diketene at a temperature of from about 80° C. to about 85° C.

6. A process for making 1-phenyl-3-methylpyrazolone-5, which comprises dissolving phenylhydrazine in an inert liquid solvent, heating the solution to a temperature higher than about 40° C., slowly adding thereto diketene in an amount of equal molecular proportions with the phenylhydrazine, while continuously removing the water formed, and recovering the product of the reaction by crystallization.

7. A process for making 1-(2',4' dinitrophenyl)-3-methylpyrazolone-5, which comprises reacting equal molecular proportions of 2,4 dinitrophenylhydrazine and diketene at a temperature higher than about 40° C.

8. A process for making 1-(2',4' dinitrophenyl)-3-methylpyrazolone-5, which comprises reacting equal molecular proportions of 2,4 dinitrophenylhydrazine and diketene at a temperature of from about 80° C. to about 85° C.

9. A process for making 1-(2',4' dinitrophenyl)-3-methylpyrazolone-5, which comprises dissolving 2,4 dinitrophenyl-hydrazine in an inert liquid solvent, heating the solution to a temperature higher than about 40° C., slowly adding thereto diketene in an amount of equal molecular proportions with the 2,4 dinitrophenylhydrazine, while continuously removing the water formed, and recovering the product of the reaction by crystallization.

10. A process for making 1-(m-methylphenyl)-3-methylpyrazolone-5, which comprises reacting equal molecular proportions of m-tolylhydrazine and diketene, at a temperature higher than about 40° C.

11. A process for making 1-(m-methylphenyl)-3-methylpyrazolone-5, which comprises reacting equal molecular proportions of m-tolylhydrazine and diketene at a temperature of from about 80° C. to about 85° C.

12. A process for making 1-(m-methylphenyl)-3-methylpyrazolone-5, which comprises dissolving m-tolylhydrazine in an inert liquid solvent, heating the solution to a temperature higher than about 40° C., slowly adding thereto diketene in in an amount of equal molecular proportions with the m-tolylhydrazine, while continuously removing the water formed, and recovering the product of the reaction by crystallization.

FRANKLIN JOHNSTON.